United States Patent
Yang et al.

(10) Patent No.: US 10,948,108 B2
(45) Date of Patent: Mar. 16, 2021

(54) TURBINE ENGINE DUCT

(71) Applicant: Unison Industries, LLC, Jacksonville, FL (US)

(72) Inventors: Yanzhe Yang, Waynesville, OH (US);
Daniel Dyer, Dayton, OH (US);
Armando Bringas, Querétaro (MX);
Jason Levi Burdette, Beavercreek, OH (US); Gordon Tajiri, Allentown, PA (US); Dattu GV Jonnalagadda, Ponnur (IN); Michael Thomas Kenworthy, Gilbert, AZ (US)

(73) Assignee: Unison Industries, LLC, Jacksonville, FL (US)

( * ) Notice: Subject to any disclaimer, the term of this patent is extended or adjusted under 35 U.S.C. 154(b) by 130 days.

(21) Appl. No.: 15/584,739

(22) Filed: May 2, 2017

(65) Prior Publication Data
US 2018/0320801 A1    Nov. 8, 2018

(51) Int. Cl.
*F16L 9/00* (2006.01)
*B22F 5/10* (2006.01)
(Continued)

(52) U.S. Cl.
CPC .............. *F16L 9/006* (2013.01); *B22F 5/106* (2013.01); *B23P 15/00* (2013.01); *F02C 6/08* (2013.01); *F02C 7/14* (2013.01); *F02C 7/185* (2013.01); *F16L 27/111* (2013.01); *F28D 7/106* (2013.01); *F28F 1/06* (2013.01); *B22F 3/1055* (2013.01); *B22F 5/009* (2013.01); *B22F 2005/103* (2013.01); *B22F 2998/10* (2013.01); *B22F 2999/00* (2013.01); *B64D 13/06* (2013.01); *F05D 2220/32* (2013.01); *F05D 2230/22* (2013.01); *F05D 2230/31* (2013.01);
(Continued)

(58) Field of Classification Search
CPC ................. F16L 9/006; F28F 1/06; F28F 1/02
USPC ..................................................... 138/DIG. 11
See application file for complete search history.

(56) References Cited

U.S. PATENT DOCUMENTS 2,171,023 A * 8/1939 Buxton ...................... E03C 1/08
                                                     138/118
3,560,350 A    2/1971 Mattia
(Continued)

FOREIGN PATENT DOCUMENTS

CN           102959197 A        3/2013
CN           106546433 A        3/2017
(Continued)

OTHER PUBLICATIONS

"Funnel," Wikipedia, Retrieved from the Internet URL: https://en.wikipedia.org/w/index.php?title=Funnel&oldid=761101526, pp. 1-3 (Jan. 20, 2017).
(Continued)

*Primary Examiner* — Craig M Schneider
*Assistant Examiner* — David R Deal
(74) *Attorney, Agent, or Firm* — McGarry Bair PC

(57) ABSTRACT

A duct for a turbine engine, such as a gas turbine engine, can be utilized to carry a fluid from one portion of the engine to another. The duct can include a metallic tubular element having one of a varying wall thickness, a varying cross section, or a tight bend. Such a duct can be formed utilizing additive manufacturing or metal deposition on an additively manufactured mandrel.

10 Claims, 17 Drawing Sheets

(51) Int. Cl.

| | |
|---|---|
| *F28D 7/10* | (2006.01) |
| *F02C 7/14* | (2006.01) |
| *F16L 27/111* | (2006.01) |
| *F02C 6/08* | (2006.01) |
| *B23P 15/00* | (2006.01) |
| *F28F 1/06* | (2006.01) |
| *F02C 7/18* | (2006.01) |
| *B22F 3/105* | (2006.01) |
| *B22F 5/00* | (2006.01) |
| *B64D 13/06* | (2006.01) |
| *F16L 9/02* | (2006.01) |
| *F16L 51/02* | (2006.01) |
| *F28D 7/16* | (2006.01) |

(52) U.S. Cl.
CPC .... *F05D 2230/642* (2013.01); *F05D 2250/12* (2013.01); *F05D 2250/13* (2013.01); *F05D 2250/131* (2013.01); *F05D 2250/25* (2013.01); *F05D 2250/75* (2013.01); *F05D 2260/60* (2013.01); *F16L 9/02* (2013.01); *F16L 51/025* (2013.01); *F28D 7/1615* (2013.01); *F28F 2210/06* (2013.01)

(56) References Cited

U.S. PATENT DOCUMENTS

| | | | | |
|---|---|---|---|---|
| 3,603,905 | A * | 9/1971 | Schuttloffel | H01P 3/14 138/121 |
| 3,656,515 | A * | 4/1972 | Wogerbauer | E04C 3/06 138/171 |
| 4,437,679 | A * | 3/1984 | Campagnolo | B62K 19/02 138/141 |
| 5,293,922 | A | 3/1994 | Imai et al. | |
| 5,492,151 | A * | 2/1996 | Wood | F16L 11/111 138/121 |
| 5,495,873 | A * | 3/1996 | Butkiewicz | F01N 13/102 138/114 |
| 6,390,142 | B1 * | 5/2002 | Naito | F16L 39/00 138/177 |
| 6,684,909 | B2 * | 2/2004 | Ijima | B21D 11/08 138/121 |
| 7,770,604 | B2 * | 8/2010 | Sjoberg | B29C 53/78 138/177 |
| 9,581,045 | B2 | 2/2017 | Nagae et al. | |
| 2002/0017331 | A1 * | 2/2002 | Renaud | B60H 1/00557 138/121 |
| 2007/0267012 | A1 * | 11/2007 | McCarthy | B29C 45/0013 128/201.11 |
| 2008/0314469 | A1 * | 12/2008 | Buschhoff | F16L 9/18 138/114 |
| 2010/0122748 | A1 * | 5/2010 | Mizumura | B21D 26/033 138/177 |
| 2011/0085895 | A1 | 4/2011 | Durocher et al. | |
| 2012/0240580 | A1 | 9/2012 | Takemaru et al. | |
| 2013/0174935 | A1 | 7/2013 | Patterson, II et al. | |
| 2014/0023812 | A1 | 1/2014 | Hammer et al. | |
| 2015/0052872 | A1 | 2/2015 | Zurmehly et al. | |

FOREIGN PATENT DOCUMENTS

| | | |
|---|---|---|
| EP | 3311934 A1 | 4/2018 |
| WO | 2017/007530 A1 | 1/2017 |

OTHER PUBLICATIONS

Partial European Search Report and Opinion issued in connection with corresponding EP Application No. 18170078.2 dated Sep. 5, 2018.

Extended European Search Report and Opinion issued in connection with corresponding EP Application No. 18170078.2 dated Nov. 27, 2018.

European Patent Office, Communication pursuant to Article 94(3) EPC re Application No. 18170078.2-1103, dated Dec. 4, 2019, 6 pages, Netherlands.

Chinese Patent Office, Office Action re Application No. 201810410409.9, dated Mar. 3, 2020, 4 pages, China.

European Patent Office, Office Action re Corresponding Application No. 18170078.2-1103, dated Sep. 3, 2020, 5 pages, Netherlands.

Chinese Patent Office, Office Action re Corresponding Application No. 201810410409.9, dated Nov. 2, 2020, 7 pages, China.

* cited by examiner

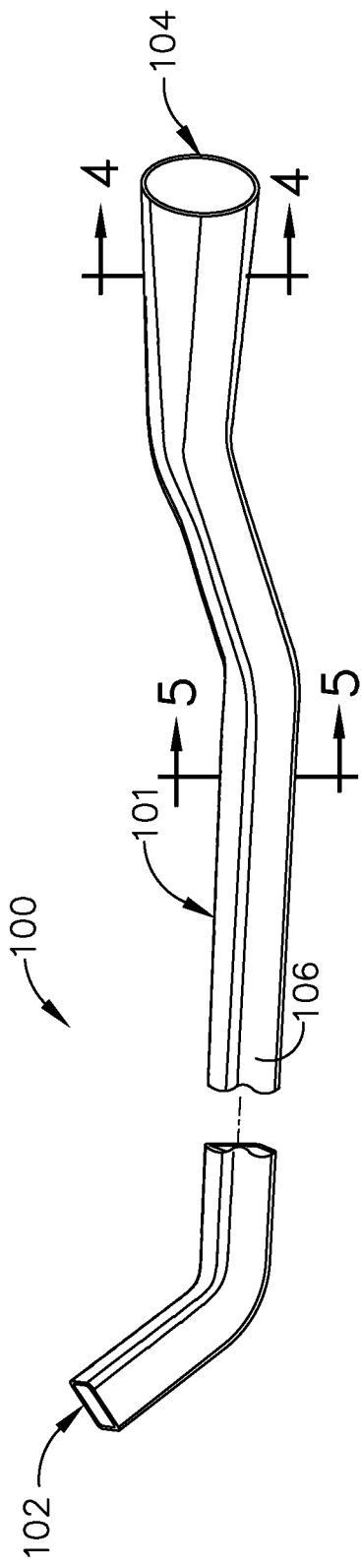
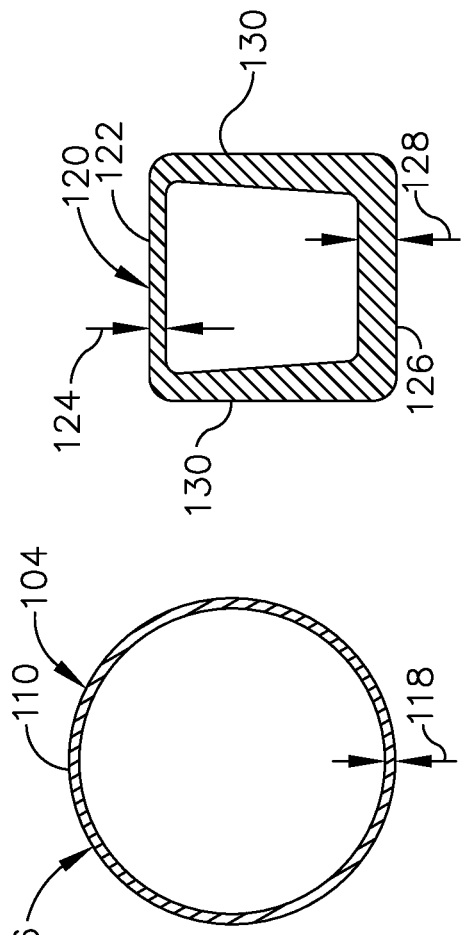
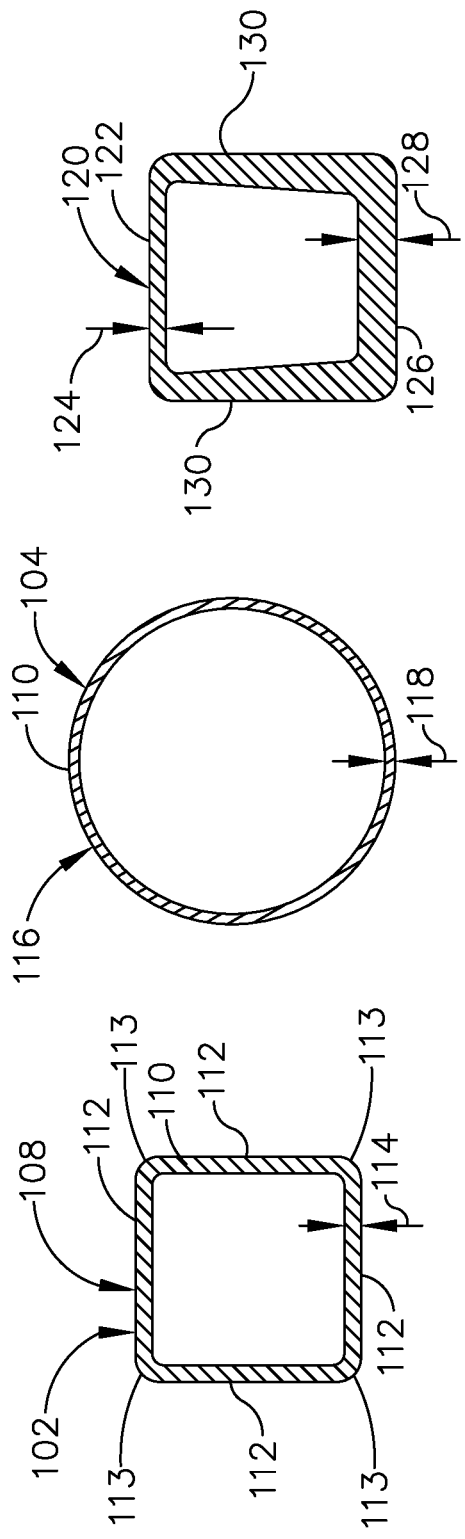
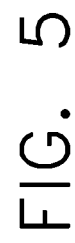

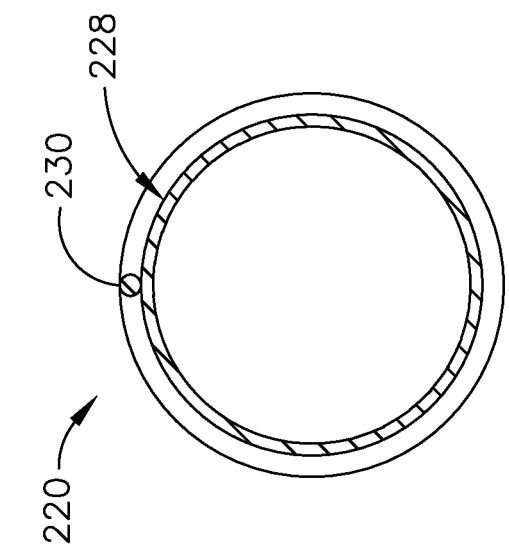
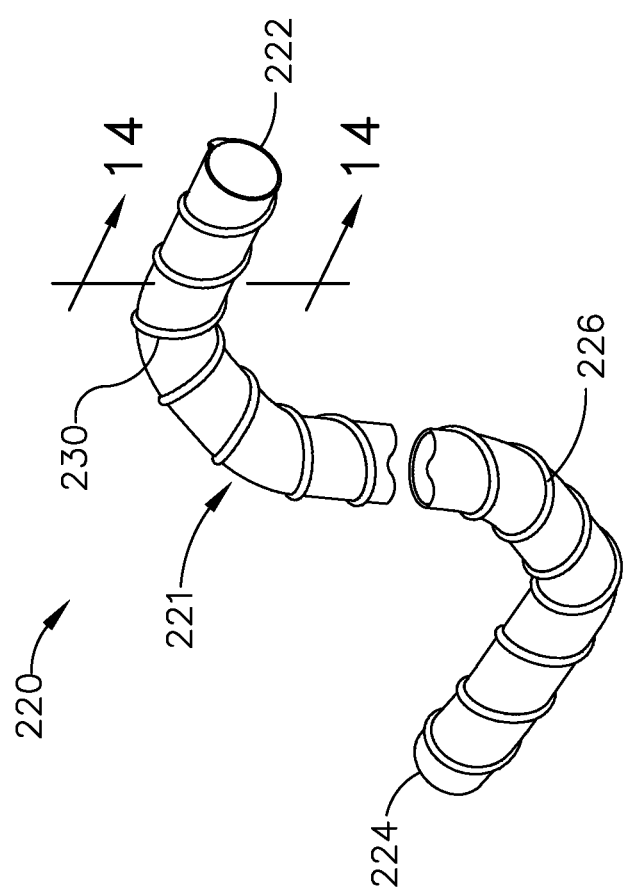

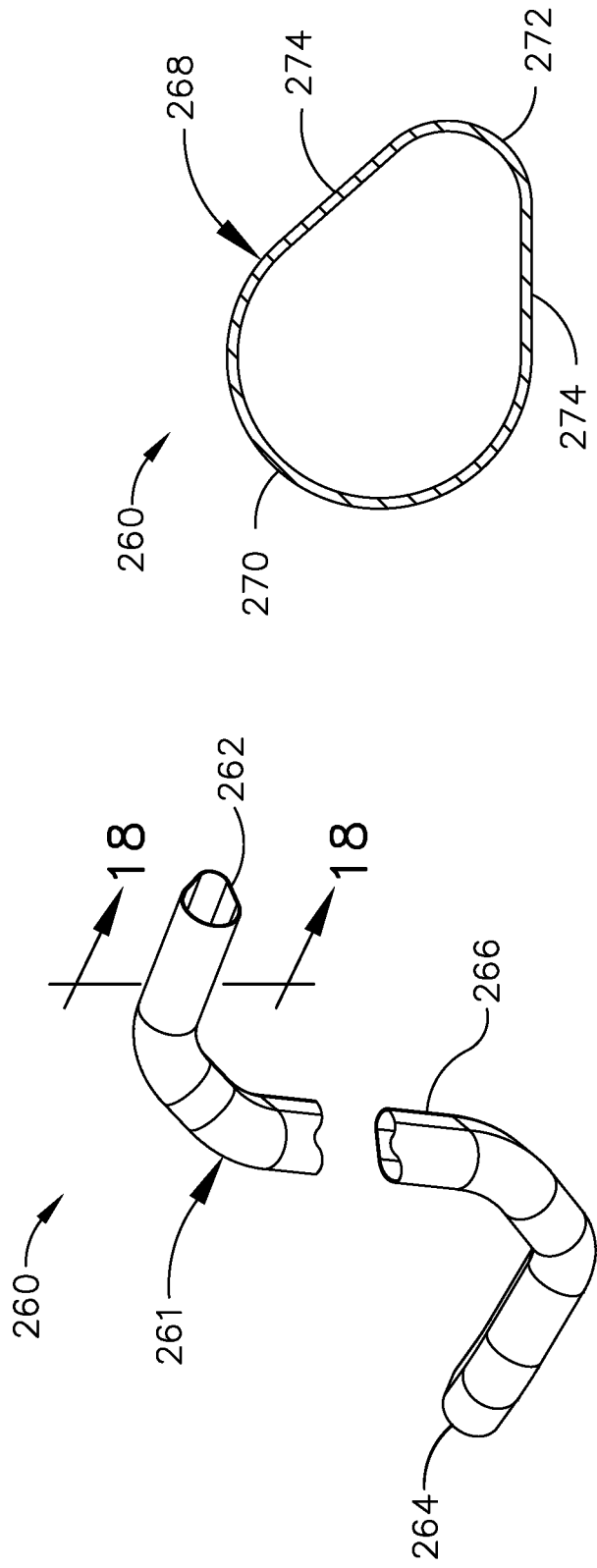

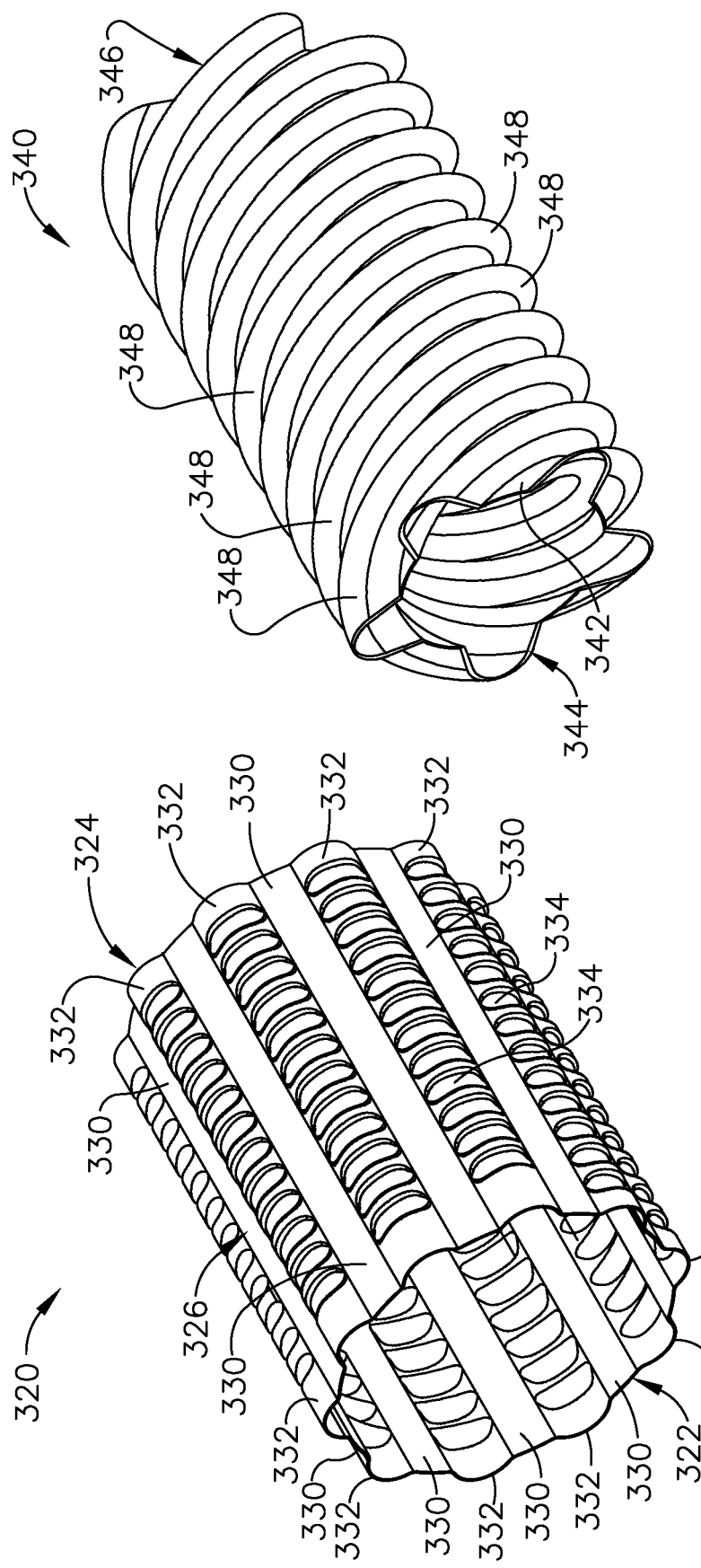

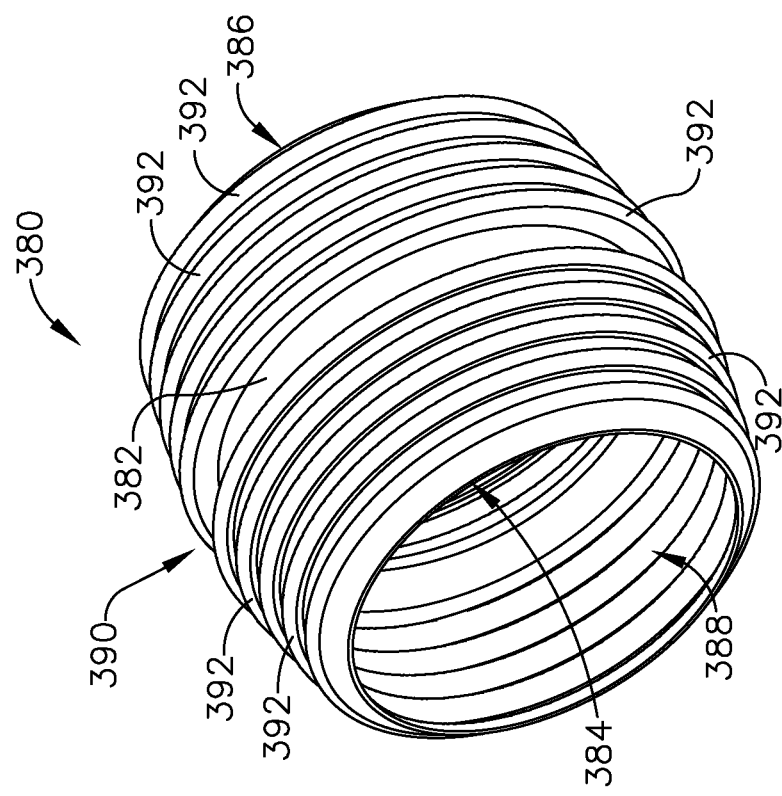
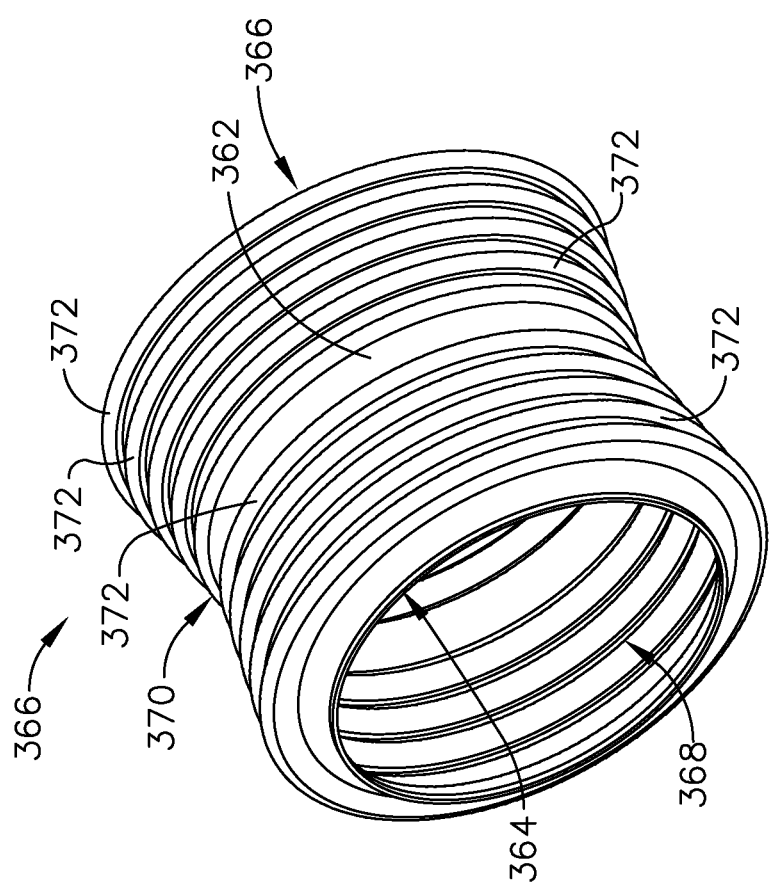

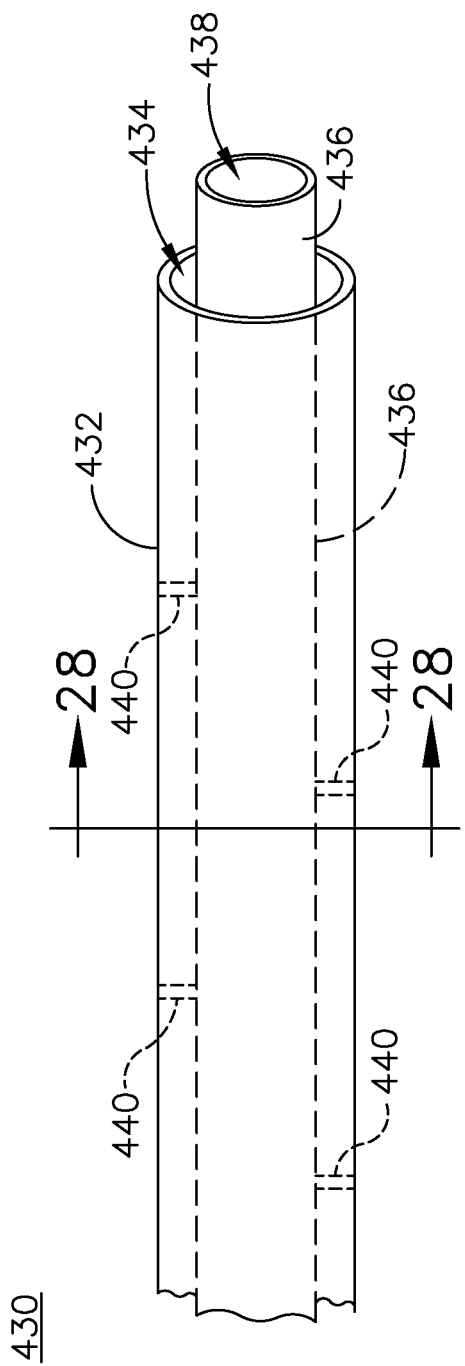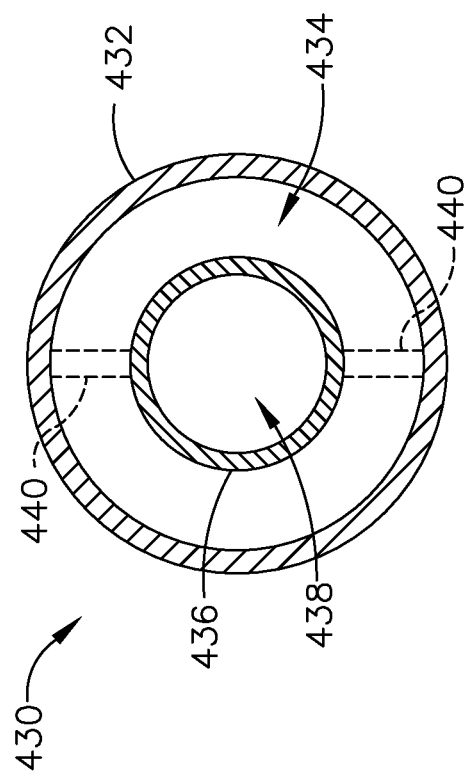

TURBINE ENGINE DUCT

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are provided about the turbine engine and include conduits for providing the flow of various operating fluids to and from the turbine engine and between stages of the turbine engine. One of the operating fluids is bleed air. In the compressor stages, bleed air is produced and taken from the compressor via feeder ducts. Bleed air from the compressor stages in the gas turbine engine can be utilized in various ways. For example, bleed air can provide pressure for the aircraft cabin, keep critical parts of the aircraft ice-free, or can be used to start remaining engines. Configuration of the feeder duct assembly used to take bleed air from the compressor requires rigidity under dynamic loading, and flexibility under thermal loading.

The complexity and spacing requirements of the turbine engine often require particular ducting paths in order to accommodate other engine components. However, duct assemblies and conduits thereof are limited by manufacturing capabilities and costs, which can lead to increased weight or inefficient duct assemblies.

BRIEF DESCRIPTION OF THE INVENTION

In one aspect, the disclosure relates to a duct comprising a metal tubular element including at least one of a varying wall thickness or a varying cross-section along at least a portion of a length of the metal tubular element. The metal tubular element is configured to covey fluid from a first portion of an engine aircraft to another portion of an aircraft engine.

In another aspect, the disclosure relates to a fluid delivery system for an engine including at least one metal tubular element that includes at least one of a varying wall thickness or a varying cross-section along at least a portion of its length. The metal tubular element is configured to have at least one of a localized mechanical property or a localized thermal property.

In yet another aspect, the disclosure relates to a method of forming a metallic tubular element including: forming, via additive manufacturing, a sacrificial mandrel having an outer surface with a predetermined geometry; depositing metal on the outer surface of the sacrificial mandrel to define the metallic tubular element where depositing metal occurs at a temperature that does not damage the sacrificial mandrel; and removing the sacrificial mandrel from the metallic tubular element.

BRIEF DESCRIPTION OF THE DRAWINGS

In the drawings:

FIG. 2 is a perspective view of a duct having a variable-shaped profile and a variable thickness in accordance with various aspects described herein.

FIG. 3 is a section view of the duct of FIG. 2 taken along section 3-3 illustrating a rounded-square profile having a first thickness.

FIG. 4 is a section view of the duct of FIG. 2 taken along section 4-4 illustrating a circular profile having a second thickness.

FIG. 5 is a cross-sectional view of the duct of FIG. 2 illustrating a rounded-square profile having a thickened portion taken across section 5-5.

FIG. 13 is a perspective view of another exemplary duct having a profile with a helical wrap in accordance with various aspects described herein.

FIG. 14 is a cross-sectional view of the second duct of FIG. 13 taken across section 14-14.

FIG. 17 is a perspective view of yet another duct having a teardrop profile with a first radiused portion and a second radiused portion in accordance with various aspects described herein.

FIG. 18 is a cross-sectional view of the fourth duct of FIG. 17 taken across section 18-18.

FIG. 22 is a perspective view of an alternative bellows having wavy profile and a plurality of grooves in accordance with various aspects described herein.

FIG. 23 is a perspective view of another alternative bellows having a series of five helically-arranged convolutions in accordance with various aspects described herein.

FIG. 24 is a perspective view of yet another alternative bellows having a concave shape with a variable diameter and including a plurality of convolutions in accordance with aspects described herein.

FIG. 25 is a perspective view of yet another alternative bellows having a convex shape with a variable diameter and including a plurality of convolutions in accordance with aspects described herein.

FIG. 27 is a perspective view illustrating another exemplary duct assembly having a first duct and a second duct formed within the first duct in accordance with aspects described herein.

FIG. 28 is a section view of the duct assembly of FIG. 27 taken across section 28-28 of FIG. 27.

DESCRIPTION OF EMBODIMENTS OF THE INVENTION

Figure 1:
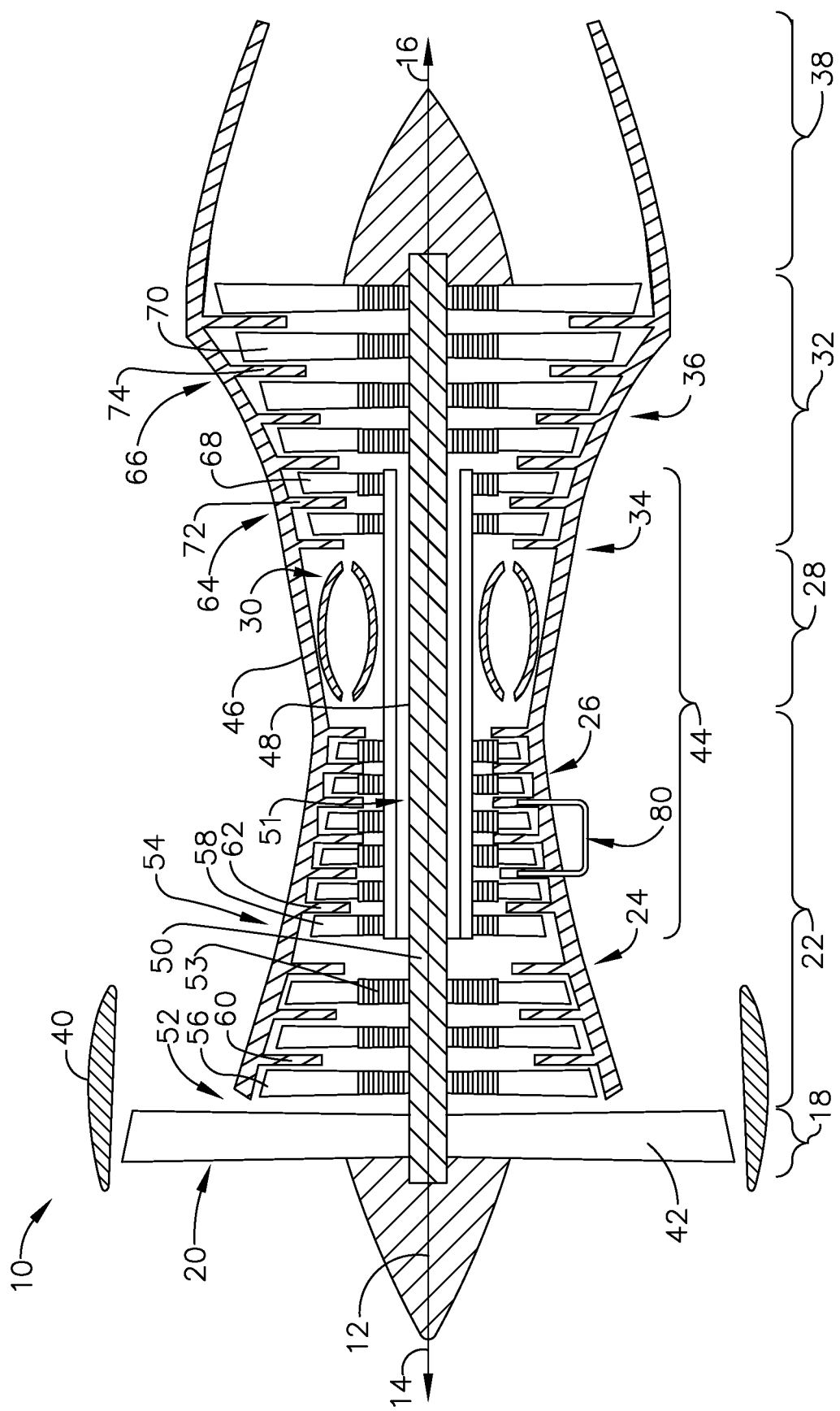
FIG. 1 is a schematic cross-sectional view of a gas turbine engine with an air ducting assembly in accordance with various aspects described herein.

The aspects of present disclosure are directed to a duct or conduit for providing a flow of fluid from one portion of an engine to another. The duct can include one of a varying wall thickness, varying cross-sectional profile, or a bend having a small radius. For purposes of illustration, the present invention will be described with respect to a gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the invention is not so limited and can have general applicability in non-aircraft applications, such as other mobile applications and non-mobile industrial, commercial, and residential applications. Additionally, the described embodiments will have equal applicability to any ducting system experiencing high system loading or large thrust and shear loads requiring a flex joint to connect elements.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more bleed air duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

A plurality of ducts are described herein having different cross-sectional shapes, areas, and profiles, which can further include varying thicknesses, or bends with small radiuses of curvature. Such form, shape, physical dimensions or organizations of the ducts can be collectively described as a geometry of the ducts, and can include one or more of the physical dimensions or organizations. Additionally, the ducts, or metal tubular elements thereof, can also be a fluid delivery system, for routing a fluid through the engine 10, such as through the bleed air duct assemblies 80.

For example, the bleed air duct assemblies 80, or other ducting assemblies leading either internally to other portions of the turbine engine 10 or externally of the turbine engine 10, can include one or more metal tubular elements or metallic tubular elements forming ducts or conduits. Referring to FIG. 2, such a duct 100 can include a metal tubular element 101 with a first end 102 and a second end 104. A passage 106 is defined within the duct 100 between the first end 102 and the second end 104.

A variable profile having a variable thickness and a variable cross-section between the first and second end 102, 104 can be included in the duct 100. In FIG. 3, taken along section 3-3 of FIG. 2, the first end 102 includes a rounded-edge-square profile 108 having an outer wall 110 with four linear sides 112 and rounded corners 113. The outer wall 110 includes a first thickness 114 that is uniform around the entire outer wall 110.

In FIG. 4, taken along section 4-4 of FIG. 2, the second end 104 of the duct 100 includes a circular profile 116 with the outer wall 110 including a second thickness 118 where the second thickness 118 is different from the first thickness 114. The second thickness 118 is uniform about the entirety of the second end 104. The second thickness 118 can be less than the first thickness 114, resultant of the second end 104 having a greater cross-sectional area than the first end 102. However, it is contemplated that the second thickness 118 can alternatively be greater than or equal to the first thickness 114.

In FIG. 5, a third profile 120 of the duct 100 is illustrated as a cross-sectional cut taken along section 5-5 of FIG. 2. The third profile 120 includes an exterior having a rounded-square shape, with an interior having a rounded-trapezoidal shape. The profile 120 includes a first side 122 having a third thickness 124 and a second side 126 having a fourth thickness 128. Two connecting sides 130 connect the first side 122 and the second side 126. The connecting sides 130 have been illustrated as including a thickness that transitions between the third thickness 124 of the first side 122 and the fourth thickness 128 of the second side 126. The third thickness 124 can be equal to the first thickness 114 of the first end 102, for example. The fourth thickness 118 can be greater than the third thickness 124. However, it will be understood that the thicknesses can be alternatively sized. In one non-limiting example, the third thickness 124 can be 0.762 millimeters or 0.030 inches and the fourth thickness 128 can be 1.016 millimeters or 0.040 inches.

It should be appreciated that the duct 100 as shown can represent only a portion of the duct, and can be shorter or longer, including more or different profiles, thicknesses, turns, or cross-sectional areas.

It should be further appreciated that the duct 100 of FIGS. 2-5, or any duct described herein, can include a variable thickness along one or more portions of the duct. The variable thickness can have increased thicknesses locally to increase strength or durability of the duct, such as at portions encountering heightened operational temperatures or stresses, or at turns along the duct 100. Such variable thicknesses can provide for a duct having variable thermal or mechanical properties. For example, a duct having an increased thickness can provide for improved structural integrity in order to operate under heightened stresses or loads. In another example, the duct can have a decreased thickness, which can provide for improved heat transfer along the duct. Such an implementation may be beneficial in the use of heat exchangers. Furthermore, the variable profiles and thicknesses can include dimples, or structures that can enhance thermal transfer of the fluid at the duct. For example, the variable profile can include helical ribs to turbulate a fluid travelling within or around the duct. Additionally, the variable thickness can also include lesser thicknesses to decrease engine weight, or even increase local convective transfer. Furthermore, the ducts as described herein can have a transitional thickness as a varying thickness along a portion of the profile of the duct. Such a transitional thickness is illustrated by the sides 130 of FIG. 5.

Additionally, it should further be appreciated that the duct 100, or any duct described herein, can include any suitable type of varying profile. Such a varying profile can include different profile shapes, different cross-sectional areas, different thicknesses, or a combination thereof. The varying profiles can improve local strength, can be adapted based upon local thermal needs, or can be adapted to fit into crowded areas of the engine.

Figure 6:
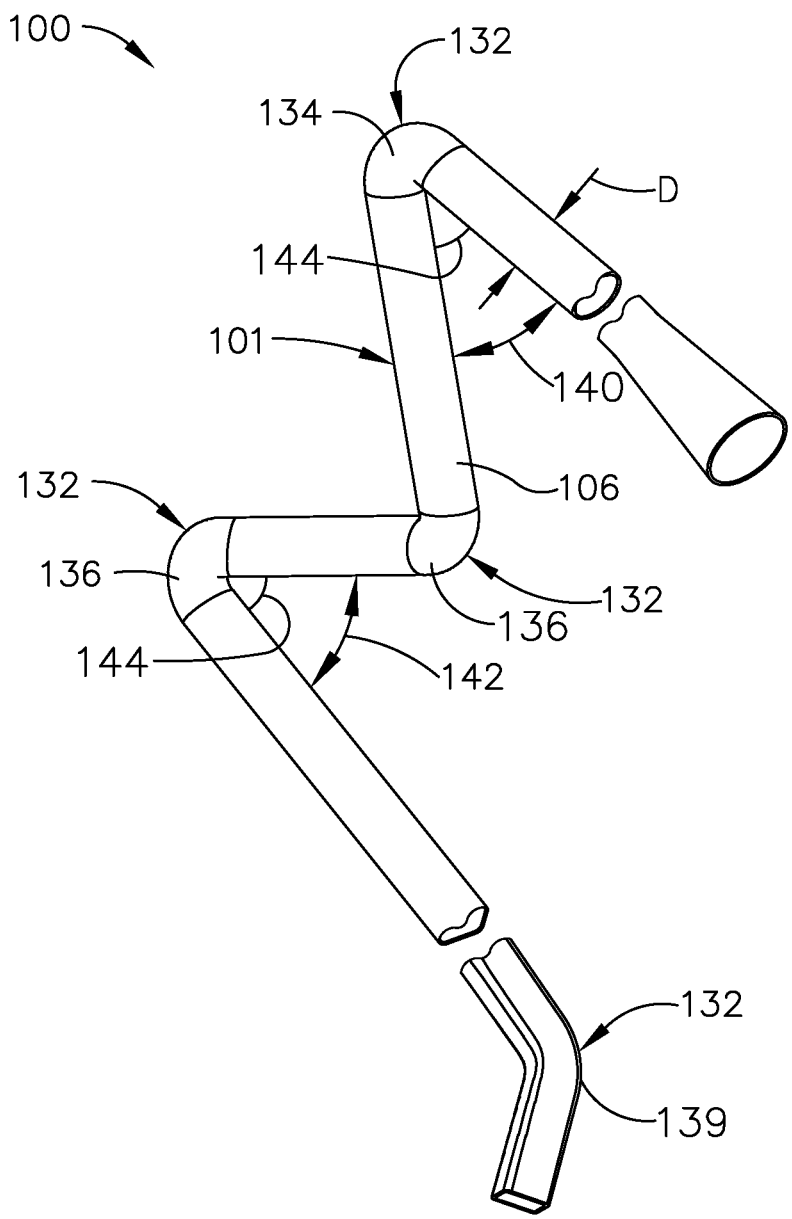
FIG. 6 is a perspective view of the duct of FIG. 2 having small-radiused bends in accordance with various aspects described herein.

Referring to FIG. 6, the duct 100 is illustrated in an alternative bent configuration and can define a passage diameter D. The duct 100 includes four bends 132 shown as a first bend 134, a second bend 136, a third bend 138, and a fourth bend 139. The first bend 134 and the third bend 138 have been illustrated as being "tight bends," defining a first angle 140 and a second angle 142, respectively. Furthermore, the term "tight bend" can include a radius of curvature that is less than twice the diameter D of the duct 100. In non-limiting examples, the tight bend can include a radius of curvature that is equal to the diameter D, or one-half of the diameter D. The tight bends as described herein provide for increased maneuverability and a greater bending range for the duct 100. Such tight bends can provide for providing ducting through crowded or complex regions of the engine, where accommodating space is important or necessary. Additionally, the improved maneuverability can provide for decreased engine weights, as the improved maneuverability can provide for duct geometries to snake through the crowded engine areas, requiring less total ducting. It should be understood that the second bend 136 is not a tight bend in order to illustrate that other bends in the duct 100 are not required to be tight bends, but can be any bend. It should be further understood that the "tight bend" as described herein cannot be made by traditional machine bending of a metal tube or duct. Traditional bending causes excessive stress on the duct or tube that causes fracture or breakage, thus limiting the potential to bend to a radius of curvature twice the diameter of the duct. The duct 100 having the first bend 134 and the third bend 138 as described are not subject to such limitations.

It should be appreciated that the unique profiles, the variable profiles, the variable thicknesses, and the tight bends as described herein can be used alone or in combination with one another to develop a particular duct adapted to the particular needs of the engine. For example, the unique profiles can be used to accommodate the duct along other shaped areas of the engine, aligning at least partially complementary to one another. For example, providing four cylindrical ducts next to one another necessarily requires a gap between them. Utilizing a unique profile can minimize or eliminate such a gap, which can improve efficient use of valuable space within an engine. Additionally the unique profiles can provide for increased surface area to improve heat transfer at the duct. Furthermore, the unique profiles can provide for improved strength or durability for the ducts operating under mechanical and thermal stresses.

It should be further appreciated that the variable profiles can be used to adapt a single duct to changing needs for the duct along the engine. For example, a forward portion of the duct may be susceptible to greater engine stresses, while an aft portion of the duct may be susceptible to a greater range of engine temperatures. Varying the profile can be used to adapt a single duct to varying factors along the length of the duct. Similarly, the varying profiles can be used to fit the duct into crowded engine areas. For example, at a forward portion of the duct, it may be advantageous to use a circular profile, while an aft portion of the duct may require a squared profile. The variable profile can accommodate such needs.

It should be further appreciated that the variable thicknesses can be used to balance engine weight with local strength and durability. For example, the duct at a junction or connection to another component may need increased durability. The increased thickness can be provided adjacent the junction or connection to provide the increased durability. Away from the areas requiring increased durability and strength, the thickness can be decreased in order to minimize engine weight, having a positive impact on engine efficiency. As such, the thickness of the duct can be varied locally in order to maximize strength and minimize engine weight.

It should be further appreciated that tight bends can be used to adapt the geometry of the duct to snake through complex crowded areas, minimizing total duct length and improving flow rates while minimizing engine weight. The tight bends can be supplemented with the variable profiles or thicknesses to ensure that local strength requirements are met for the tight bends.

Figure 7:
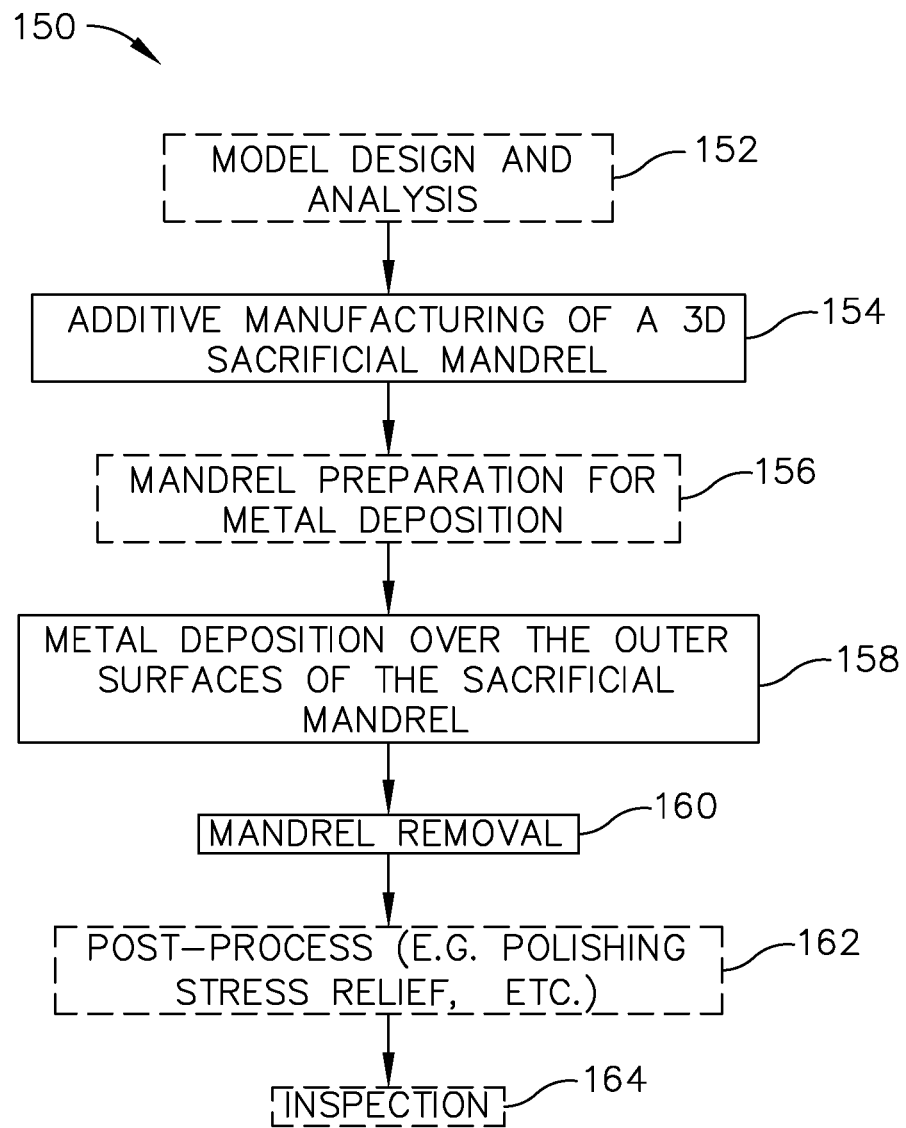
FIG. 7 is a flow chart illustrating a manufacturing process for forming the ducts and metal tubular elements as described herein.

Referring to FIG. 7, a flow chart illustrates a method of forming a metallic tubular element such as any of the ducts described herein. At 152, the method can optionally include, modelling and designing a desired metallic tubular element. Such a metallic tubular element can be adapted for a particular use and location within a turbine engine. At 154, the method can include forming, using additive manufacturing, a three-dimensional (3D) mandrel having an outer surface with a predetermined geometry. The 3D mandrel can be a sacrificial mandrel made of plastic, for example, or any other removable material such as wax. At 156, the mandrel can be prepared for metal deposition. Such preparation can include surface treatments to facilitate uniform deposition along the mandrel.

The method can further include, at 158, depositing metal on the outer surface of the sacrificial mandrel. Depositing metal on the sacrificial mandrel can form a metallic tubular element where depositing metal occurs at a temperature that does not damage the outer surface having the predetermined geometry of the sacrificial mandrel. Depositing metal on the outer surface can be accomplished, in non-limiting examples, by electrochemical deposition or cold metal spray deposition. The metallic tubular element can include at least one of a varying wall thickness or a varying cross-section along at least a portion of its length, or it can include both a varying wall thickness and a varying cross-section, such as that of FIGS. 2-5. The metal deposition can further include depositing metal to a predetermined thickness. The predetermined thickness, in one non-limiting example, can include a thickness more than 0.15 millimeters (mm). The metallic tubular element can further include a non-circular cross section, such as, in non-limiting examples, a rounded square, teardrop, cross, corkscrew, or any other profile suitable to the particular needs of the duct or metallic tubular element. Furthermore, the metallic tubular element can have at least one curve that includes a radius of curvature that is less than twice the diameter or greatest cross-sectional distance of the metallic tubular element.

The method can further include, at 160, removing the sacrificial mandrel from the metallic tubular element. Removal of the sacrificial mandrel can include, in non-limiting examples, melting or chemically etching the sacrificial mandrel. In essence the sacrificial mandrel is destroyed during this process.

At 162, the metallic tubular element can pass through optional post-processing that can include, in non-limiting examples, operations such as polishing, stress relieve, shaping, or insertion of a bellows within the metallic tubular element. At 164, the final product can be optionally inspected.

The ducts, metallic tubular elements, and bellows can all be formed utilizing a sacrificial mandrel formed by additive manufacturing in combination with low temperature metal deposition processes. The electrochemical deposition or low temperature metal deposition utilizing cold metal spray technologies on the mandrel can be used to form the ducts and bellows as described above. Utilizing the mandrel can provide for improved yields and improve product precision.

Figure 10:
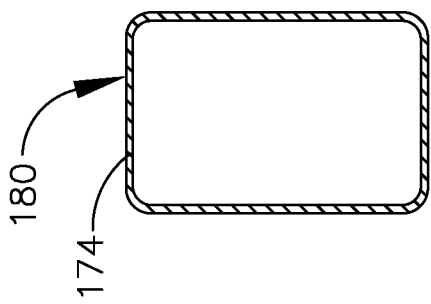
FIG. 10 is a cross-sectional view of the duct of FIG. 8 taken along section 10-10 illustrating a rounded-rectangular profile.
Figure 9:
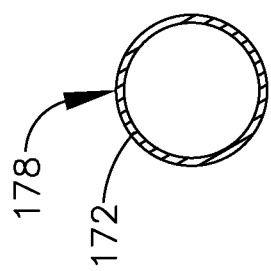
FIG. 9 is a cross-sectional view of the duct of FIG. 8 taken along section 9-9 illustrating a circular profile.
Figure 8:
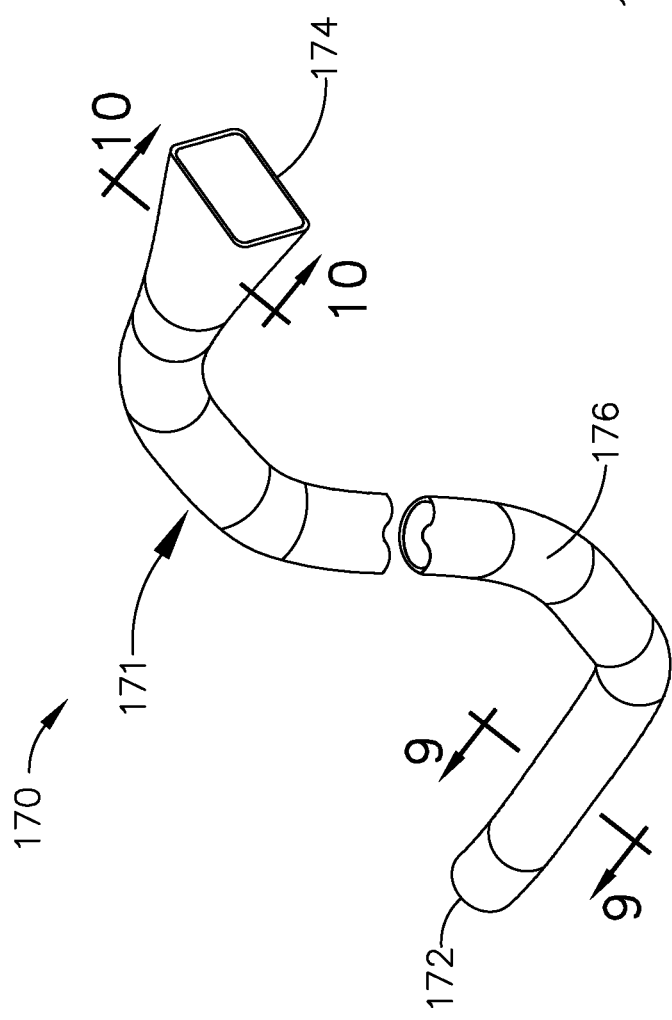
FIG. 8 is a perspective view an another exemplary duct having a first end and second end with a variable-shaped profile in accordance with various aspects described herein.

Referring to FIG. 8, at least a portion of an alternative duct 170 includes a metal tubular element 171 with a variable profile having a uniform thickness along its length. The duct 170 includes a first end 172 and a second end 174, defining a passage 176 there between. In FIG. 9, taken across section 9-9 of FIG. 8, the first end 172 includes a first cross-sectional shape, formed as a circular profile 178. In FIG. 10, taken across section 10-10 of FIG. 8, the second end 174 includes a second cross-sectional shape, formed as a rounded, rectangular profile 180. The first end 172 can include a cross-sectional area that is less than that of the second end 174. A fluid passing within the duct 170 can decrease in velocity extending from the first end 172 toward the second end 174 with the increase in cross-sectional area of the fifth duct 170. The variable profiles 178, 180 can be used to tailor the duct 170 to fit within particular crowded areas or spaces, while particularly affecting a flow of fluid passing through the duct 170. In addition to velocities, the variable cross-sectional shapes or areas can be used to vary the pressures, flow rates, or temperatures of the fluids passing through the duct 170.

Figure 12:
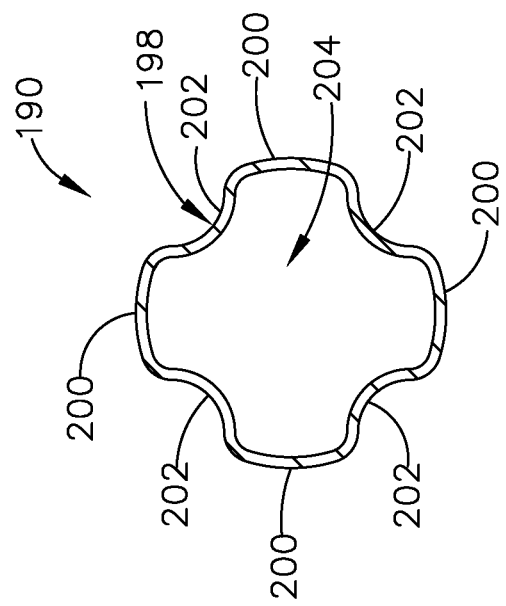
FIG. 12 is a cross-sectional view of the duct of FIG. 11 taken across section 12-12.
Figure 11:
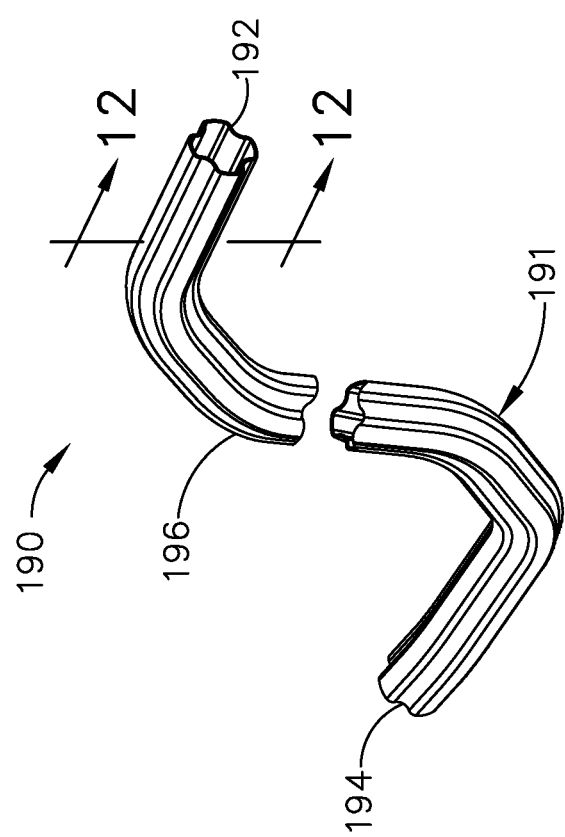
FIG. 11 is a perspective view of another exemplary duct having a cross profile with convex sides and concave corners in accordance with various aspects described herein.

Additional exemplary alternative profiles for the ducts are described herein. It should be understood that the alternative profiles as shown are non-limiting, and the ducts and metallic tubular elements can include any profile suitable for the particular duct, any transitional shape between two profiles, or having any thickness or variable thickness at the particular profile. Referring to FIG. 11, at least a portion of a duct 190 includes a metal tubular element 191 with a first end 192 and a second end 194 opposite of the first end 192 defining a passage 196 there between. In FIG. 12, the duct 190 includes a cross-shaped profile 198 taken along section 12-12 of FIG. 11, having four convex sides 200 interconnected by four concave, rounded corners 202 surrounding an interior 204 of the first duct 190. While four convex sides 200 interconnected by four corners 202 are shown, any number of sides 200 and complementary corners 202 are contemplated.

Referring to FIG. 13, at least a portion of another duct 220 includes a metal tubular element 221 having a first end 222 and a second end 224 opposite the first end 222, defining a passage 226 there between. A rib in the form of a helical wrap 230 winds around the exterior of the second duct 220. In FIG. 14, the duct 220 includes a circular profile 228, taken along section 14-4 of FIG. 13. The helical wrap 230 can be formed integral with the second duct 220. While only one helical wrap 230 is shown, any number of helical wraps are contemplated. Alternatively, ribs can be formed as a plurality of concentric rings that are not interconnected with one another. Furthermore, while the rib has a circular profile, any shape or size profile is contemplated. The rib can further define a varying wall thickness for the second metal tubular element 221 or a varying cross-section rotating about the duct 220.

Figures 15, 16:
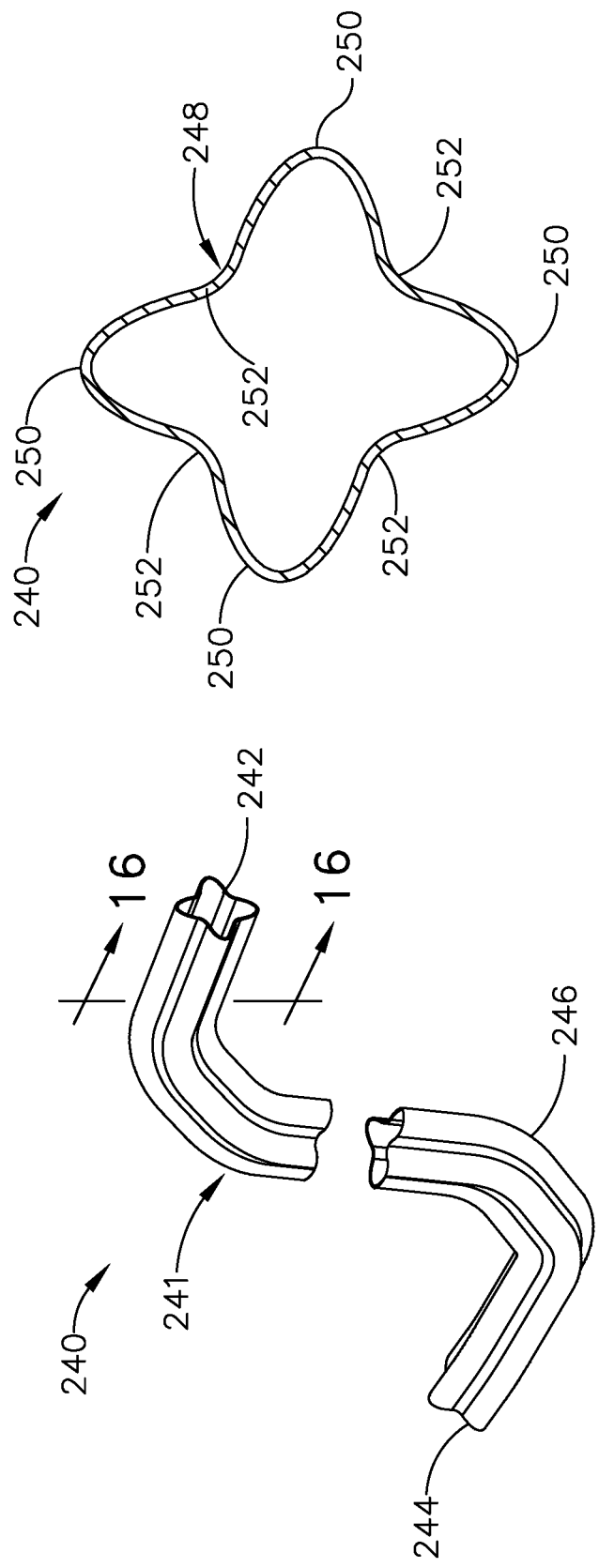
FIG. 15 is a perspective view of yet another duct having another cross profile with four peaks separated by four valleys in accordance with various aspects described herein.
FIG. 16 is a cross-sectional view of the duct of FIG. 15 taken across section 16-16.

Referring to FIG. 15, at least a portion of yet another duct 240 includes a metal tubular element 241 with a first end 242 and a second end 244 opposite of the first end 242, defining a passage 246 there between. In FIG. 16, taken across section 16-16 of FIG. 15, the duct 240 includes a rounded, cross-shaped profile 248 having four peaks 250 separated by four complementary valleys 252. In alternative examples, the third duct 240 can have any number of peaks 250 separated by any number of complementary valleys 252.

Referring to FIG. 17, at least a portion of yet another duct 260 includes a metal tubular 261 element having a first end 262 and a second end 264 opposite of the first end 262, defining a passage there between 266. In FIG. 18, taken across section 18-18 of FIG. 17, the duct 260 includes a teardrop profile 268 having a first radiused portion 270 and a second radiused portion 272, with the first radiused portion 270 having a greater radius of curvature that the second radiused portion 272. Two flat portions 274 interconnect the first radiused portion 270 and the second radiused portion 274. While the profile 268 of the fourth duct 260 includes two radiused portions, any number of radiused portions having differing radiuses of curvature are contemplated.

The aforementioned exemplary profiles are illustrative of different examples of ducts, and metal tubular elements thereof, having differing profiles. As such, it should be understood that the duct, conduits, and metal tubular elements used in the duct assembly can have differing profiles, that are beyond standard cylindrical or squared conduits. Such conduits can include, in non-limiting examples, conduits having one or more of the convex sides 200, concave corners 212, wrap 230, peak 250, valley 252, first radiused portion 270, second radiused portion 272, or the flat portions 274, in any combination. Thus, it should be appreciated that the conduits can have variable or unique profiles. Such profiles can be advantageous for providing sufficient ducting within crowded areas within a turbine engine where space is limited.

Figure 19:
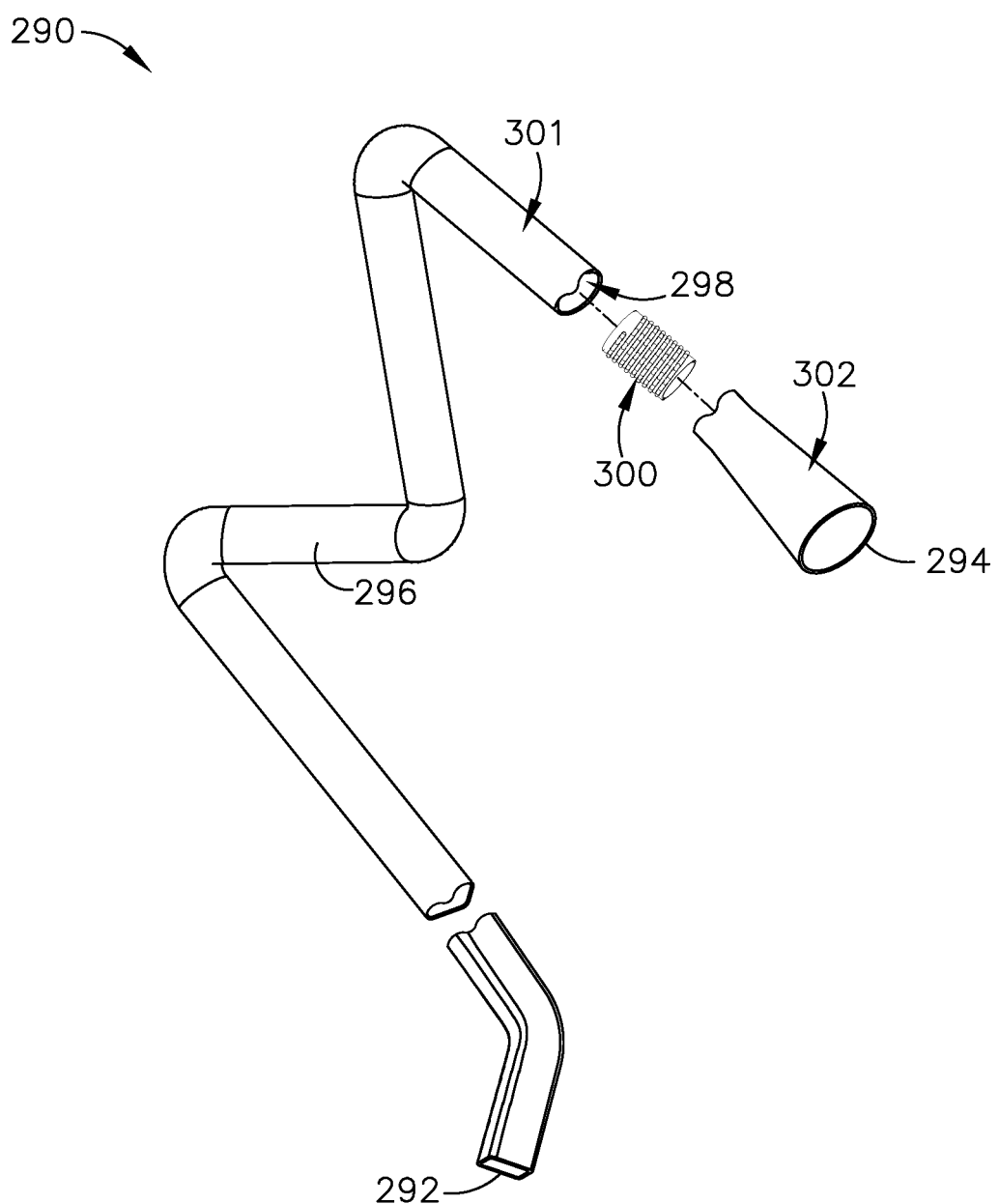
FIG. 19 is a perspective view of another duct having a bellows provided in an interior of the duct in accordance with various aspects described herein.

The ducts, or metal tubular elements thereof, as described herein can include a bellows provided on the interior of the duct facilitating the adjoining of two or more ducts or fluidly coupling sections of a duct at a flexible joint. The bellows can provide for carrying the flow of fluid within the duct, as well as influencing the flow of fluid. FIG. 19 illustrates a duct 290, which can be similar to the duct 100 of FIG. 6. The duct 290 includes a first end 292 and a second end 294 defining a passage 296 there between. An interior 298 can be defined within the passage 296. The duct 290 can be separated into two portions including a first portion 301 and a second portion 302. A bellows 300 can be provided in the interior 298 at a junction between two portions 301, 302 for adjoining the two portions and fluidly coupling the interior 298 of the first and second portions 301, 302. The bellows permits expansion and contraction of the first and second portions 301, 302 at joints while fluidly coupling the two portions 301, 302. Additionally, the bellows 300 can permit dampening loading or similar operational forces for an engine.

Figure 21:
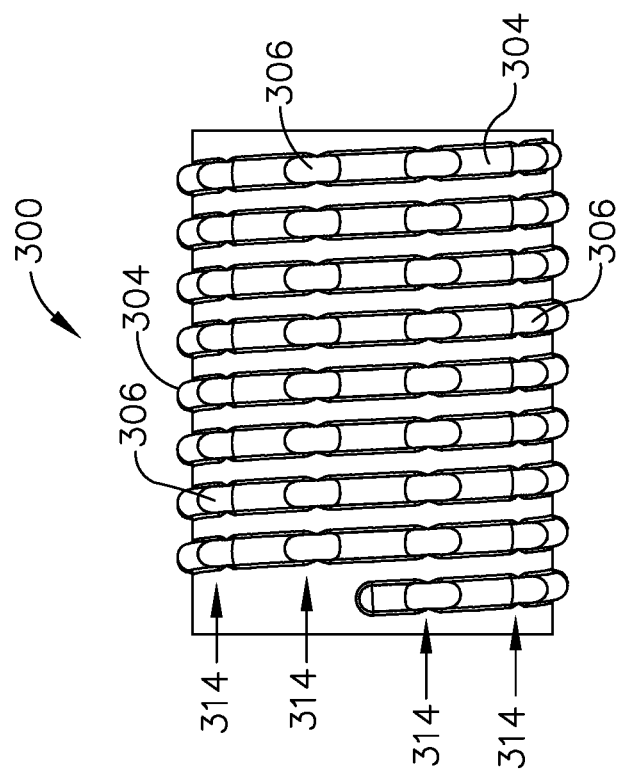
FIG. 21 is a side view of the bellows of FIG. 20 illustrating the grooves organized into rows.
Figure 20:
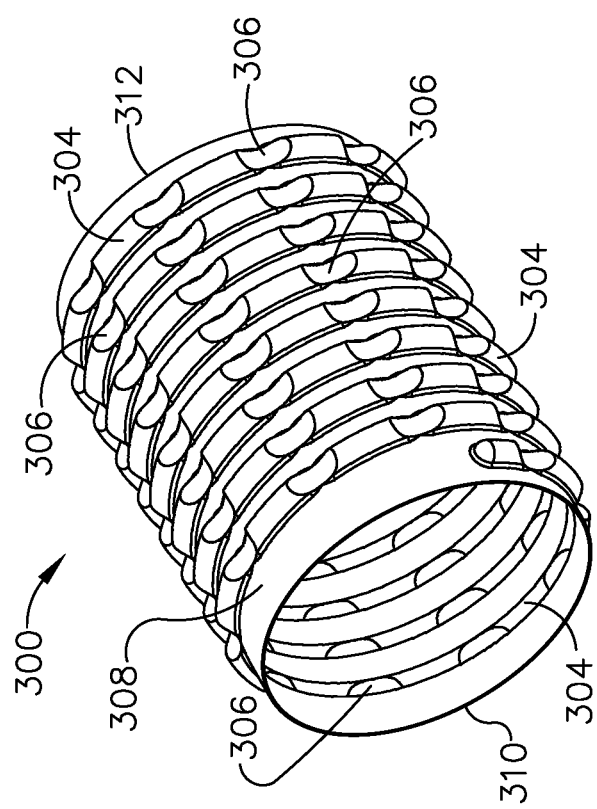
FIG. 20 is a perspective view of the bellows of FIG. 20 having a helical convolution formed into an outer wall of the bellows with a plurality of grooves in accordance with various aspects described herein.

Referring to FIG. 20, the bellows 300 is illustrated including a convolution 304 and one or more grooves 306 provided in an outer wall 308 extending between a first end 310 and a second end 312. The length of the bellows 300 as illustrated is exemplary. The convolution 304 is formed in the outer wall 308 and helically wraps around the bellows 300 having a greater radius than the remainder of the outer wall 308. While only one helical convolution 304 is shown, any number of intertwined helical convolutions are contemplated. The grooves 306 are formed as a plurality of spaced grooves 306 in the helical convolution 304. Referring now to FIG. 21, the grooves 306 can be organized in a patterned manner to be aligned about the helical convolution 304. As shown, the grooves 306 are spaced every 36-degrees relative to the cylindrical shape of the outer wall 308 to form ten rows 314 of grooves about the bellows 300. Alternatively, any spacing of grooves 306 is contemplated. The bellows 300 including the helical convolution 304 with the grooves 306 can provide for improved strength or resiliency for the bellows 300. Additionally, the particular grooves 306 can be used to tailor the movement of the bellows 300, such as the force required for the bellows 300 to expand or contract. Furthermore, the particular grooves 306 or convolution(s) 304 can be used to affect a flow of fluid passing through the bellows 300, such as, in non-limiting examples, decreasing velocity or increasing turbulence of the fluid.

Referring to FIG. 22, another exemplary bellows 320 includes a first end 322 and a second end 324 defining a passage 326 there between. The bellows 320 includes a profile 328 having alternating linear portions 330 interconnecting alternative arcuate portions 332. The arcuate portions 332 are convex, extending radially outward, while it is contemplated that the arcuate portions 332 can be concave, or a combination of convex and concave. While it is shown as having ten linear portions 330 separating ten arcuate portions 332, any number of linear portions 330 and arcuate portions are contemplated. It is further contemplated that the profile of the bellows 320 can be variable, having some areas with or without the linear portions 330 or the arcuate portions 332. The arcuate portions 332 can include spaced grooves 334, while it is contemplated that the grooves 334 can be positioned on the linear portions 330, or a combination of the linear portions 330 and the arcuate portions 332.

The bellows 300 including the arcuate portions 332 and the grooves 306 can provide improved strength. Additionally, the profile and grooves 306 can be used to tailor the bellows 300 to flex in a particular manner. For example, a greater number of grooves 306 can be positioned at one portion of the bellows 300 to improve local strength, while another portion of the bellows 300 can have a lesser number of grooves 306 to encourage local flexion.

Referring now to FIG. 23, another exemplary bellows 340 includes an outer wall 342 having a first end 344 and a second end 346. The outer wall 342 includes five helical convolutions 348 intertwined with one another. The five helical convolutions 348 provide for a twisting of the bellows 340 during flexion. The number of helical convolutions 348 can be used to increase or decrease the strength of the bellows 340. Additionally, the helical convolutions 348 can be used to tailor flexion of the convolutions to rotate the bellows 340. Such rotation can be advantageous for bellows 340 within a curved or arcuate metallic tubular element.

Referring now to FIG. 24, another exemplary bellows 360 includes an outer wall 362 extending between a first end 364 and a second end 366 and defines a passage 368 there between. The outer wall 362 includes a variable cross-sectional area defining a concave portion 370. Convolutions 372 are provided along the extent of the bellows 360, and follow the concave geometry of the outer wall 362.

Similarly, FIG. 25 includes another exemplary bellows 380 including an outer wall 382 extending between a first end 384 and a second end 386 and defines a passage 388 there between. The outer wall 382 includes a variable cross-sectional area defining a convex portion 390, with convolutions 392 provided about the convex portion 390.

With regard to FIGS. 24 and 25, it should be appreciated that the bellows as described herein can have a variable cross-sectional area without consideration to convolutions provided in the bellows. For example, the bellows can have an outer wall that varies in cross-sectional area or shape, and includes convolutions further including a variable cross-sectional area provided within the variable outer wall.

Figure 26:
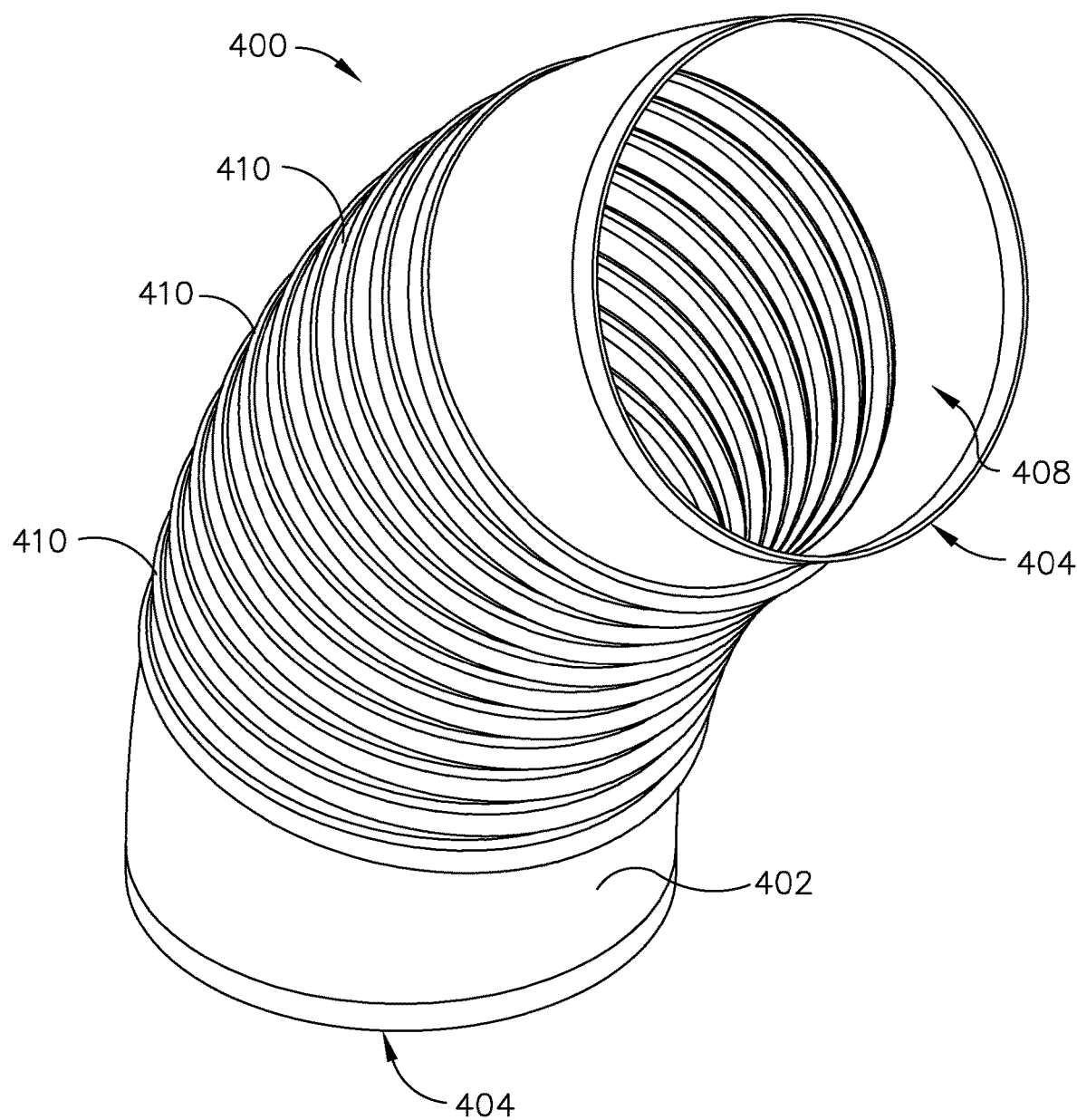
FIG. 26 is a perspective view of an arcuate bellows adapted to position in a bend of a conduit, having a plurality of convolutions in accordance with aspects described herein.

Referring to FIG. 26, yet another exemplary bellows 400 has an outer wall 402 having a curved cylindrical shape. A first end 404 is spaced from a second end 406 defining a passage 408 there between. The bellows 400 can include a plurality of convolutions 410. The convolutions 410 can be arranged around the curved outer wall 402. The convolutions 410 can be utilized to improve flexion as well as stability of the bellows extending through curved portions of a duct. For example, the curved bellows 400 can be adapted to fit into the first bend 134 or the third bend 138 of FIG. 6, having a radius of curvature that is less than twice the diameter of the duct around the bellows 400.

Referring now to FIG. 27, an exemplary duct assembly 430 is illustrated having a concentric tube geometry with a tube-in-tube design. A first duct 432 of the duct assembly 430 defines a first interior 434. A second duct 436 is provided in the interior 434 of the first duct 432, having a diameter that is smaller than that of the first duct 432. A second interior 438 is defined within the second duct 436 and can be fluidly isolated from the first interior 434. In an alternative example, the second duct 436 can have apertures or an open end to fluidly couple the ducts 432, 436 to one another.

The ducts 432, 436 can couple to a common end or mount, in order to maintain the second duct 436 spaced within the first duct 432. Alternatively or additionally, it is contemplated that spokes 440 or other fixed structural elements can optionally be used to space the second duct 436 from the first duct 432.

Referring now to FIG. 28, a sectional view of the duct assembly 430 is illustrated taken across section 28-28. The ducts 432, 436 can have similar thicknesses and circular profiles. Alternatively, it is contemplated that one or more of the ducts 432, 436 can have a variable cross-section area or shape, or a variable thickness, as described herein. Furthermore, while only two ducts 432, 436 are shown in the duct assembly 430, any number of ducts is contemplated. In yet another example, multiple ducts can be provided within the interior of an outer duct, without being provided within the interior of one another.

It should be appreciated that the duct assembly 430 provides for passing multiple fluids within a single duct assembly 430. Providing multiple fluids within the duct assembly 430 provides for a compact duct arrangement, minimizing the space required to duct multiple fluids throughout the engine, as well as providing thermal insulation, cooling, or heating. In one example, the duct assembly 430 can operate as a heat exchanger.

Figure 29:
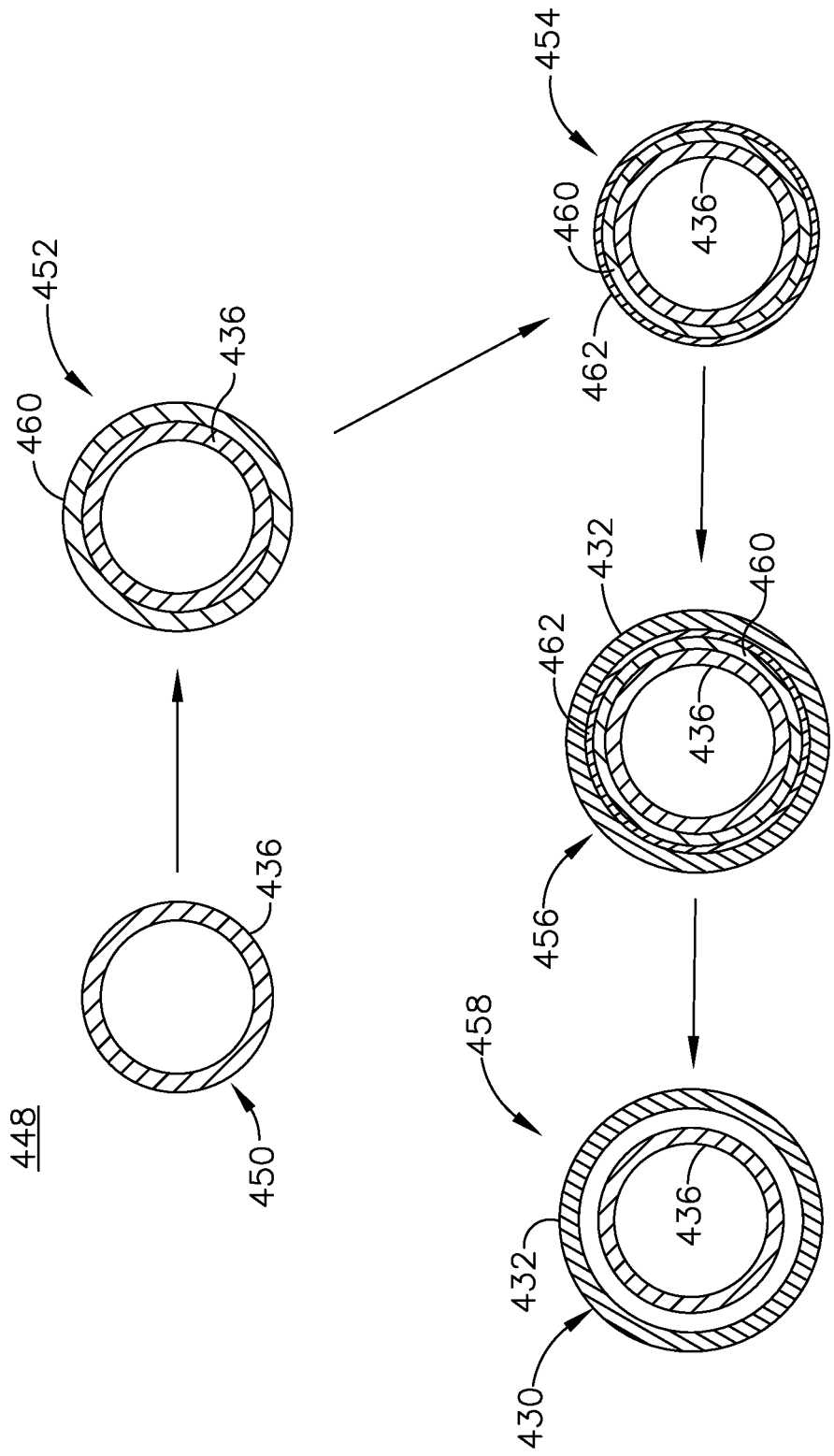
FIG. 29 is a schematic view of a method of forming the duct assembly of FIG. 27 in accordance with various aspects described herein.

Referring now to FIG. 29, an exemplary first method 448 of forming the duct assembly 430 without the spokes 440 of FIGS. 27 and 28 is described. At 450, the second duct 436 can be provide or pre-formed. For instance, prefabricated tube stock can be used. At 452, a mandrel layer 460 can be provided around the exterior of the second duct 436. The mandrel layer 460 can be formed over the second duct 436 by any suitable method, or can be pre-formed and provided over the second duct 436, such as slid along the exterior of the second duct 436. The mandrel layer 460 can be made of plastic, in one non-limiting examples, or any other readily removable material such as a material having a melting point lower than the duct assembly 430. Optionally, the spokes can be formed by 3D printing or any other suitable method during formation of the mandrel 460. Eventual removal of the mandrel 460 leaves the spokes remaining to space the first and second ducts 432, 436.

At 454, the mandrel layer 460 can be prepared, such as by providing a coating 462 over the exterior of the mandrel layer 460. The coating 462, in one non-limiting example, can be a conductive paint to facilitate bonding of a metal along the mandrel layer 460. At 456, the first tube 432 can be formed over the mandrel 460 and the coating 462. The first tube 432 can be formed by additive manufacturing, such as utilizing a cold spray or electroforming that will not deform or destroy the mandrel layer 460 during formation.

At 458, the mandrel layer 460 can be removed from the duct assembly 430. The mandrel layer 460 can be removed by any suitable method, such as heating or chemical etching. Similarly, any remnant material from the coating 462 can be removed from the ducting assembly 430 by any suitable method such as chemical etching. After removal of the mandrel layer 460, the duct assembly 430 including the first and second ducts 432, 436 remains with the first duct 432 formed around the second duct 436.

In an alternative example, the second duct 436 can be formed having a variable thickness, variable cross-sectional area, or variable shape, such as that described herein. The mandrel layer 460 can be provided over the second duct 436 and the first duct 432 can be formed complementary to the unique shape of the second duct 436. Additionally, the first duct 432 during formation can have an alternative variable thickness or cross-sectional area or shape.

Figure 30:
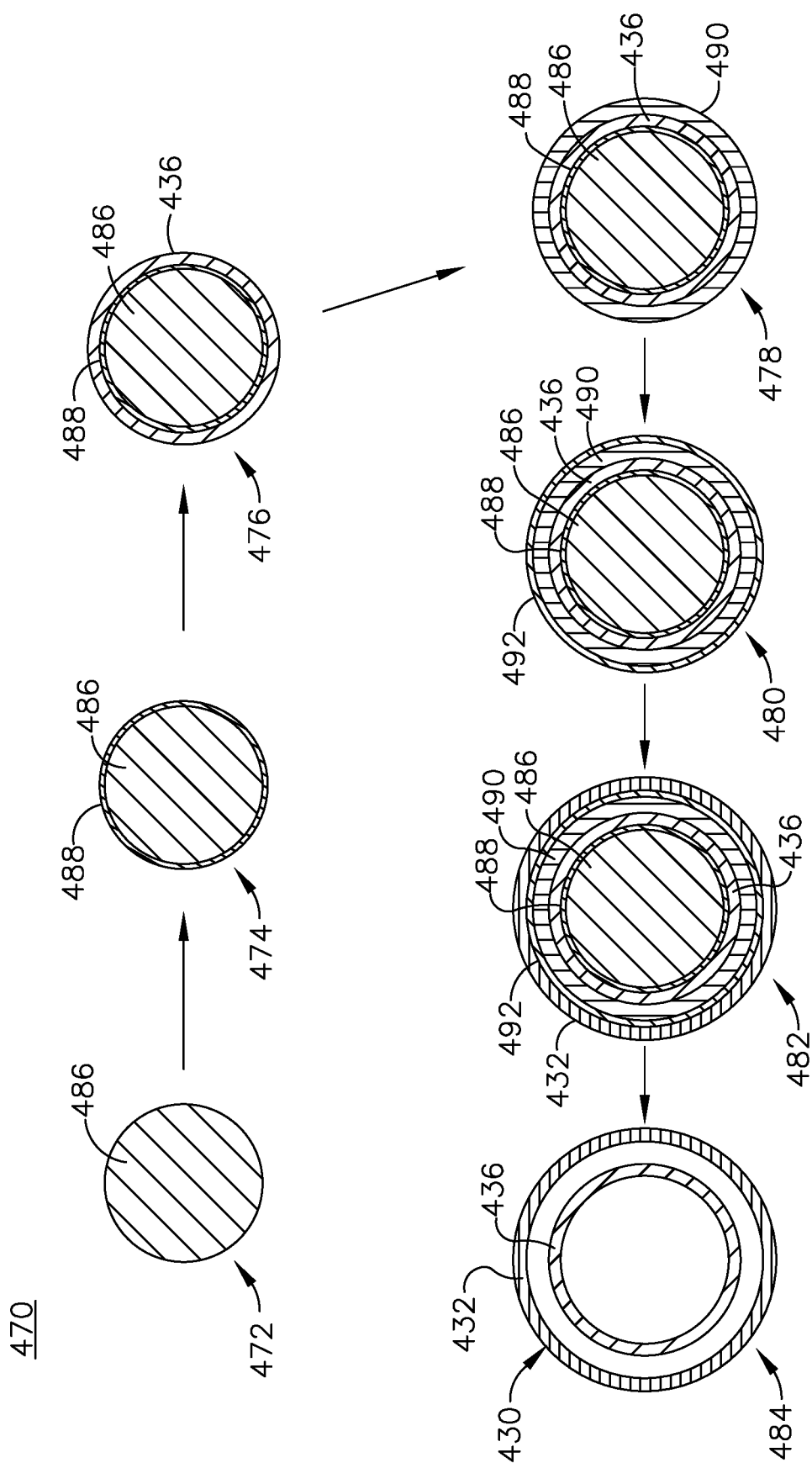
FIG. 30 is a schematic view of another method of forming the duct assembly of FIG. 27 in accordance with various aspects described herein.

Referring now to FIG. 30, an alternative exemplary second method 470 of forming the duct assembly 430 without the spokes 440 of FIGS. 27 and 28. At 472, a mandrel 486 can be provided having the profile, shape, and diameter for the second duct 436. The mandrel 486 can be made by any suitable method, and can be made of a readily removable material such as plastic. At 474, the mandrel 486 can be prepared with a coating 488 for forming the second duct 436 around the mandrel 486. At 476, the second duct 436 can be formed around the mandrel 486. The second duct 436 can be formed, in non-limiting examples, by electroforming or cold metal spray. The second duct 436 can be formed by any means that will not deform or destroy the mandrel 486 during formation. Time can pass to allow the second duct 436 to solidify.

At 478, after solidification of the second duct 436, a mandrel layer 490 can be provided over the second duct 436. The mandrel layer 490 can be made of a removable material, such as plastic, and can be formed to define a cross-sectional area and shape for the first duct 432. At 480, a second coating 492 can be applied to the mandrel layer 490 to prepare the mandrel layer 490 for formation of the first duct 432. Optionally, the spokes 440 of FIGS. 27 and 28 can be formed by 3D printing or any other suitable manner during formation of the mandrel 460. Eventual removal of the mandrel 460 leaves the spokes remaining to space the first and second ducts 432, 436.

At 482, the first duct 432 can be formed around the mandrel layer 490. The first duct 432 can be formed similar to the second duct 436, such as by cold metal spray or electroforming in non-limiting examples. The first duct 432 can be formed to have a variable cross-sectional area or shape, or a variable profile, as described herein.

At 484, the mandrel 486 and the mandrel layer 490 can be removed by any suitable method, such as heating or chemical etching. Similarly, any remnant material from the coatings 488, 492 can be removed from the ducting assembly 430 by any suitable method such as chemical etching, leaving the duct assembly 430 with the first and second ducts 432, 436 remaining.

The ducts and bellows as described herein can be formed utilizing additive manufacturing, such as with 3D printing, Direct Metal Laser Melting (DMLM), Direct Metal Laser Sintering (DMLS), electroforming, electroplating, or cold metal spray in non-limiting examples. As such, it is contemplated that the ducts and bellows can be formed without the use of a mandrel.

The ducts provided herein provide for multi-functional monolithic fluid delivery systems. The ducts provide for the freeform of lighter and more compact systems that can use localized mechanical and thermal properties with improved routing schemes. The ducts as described herein provide for utilizing ducts with novel cross-sectional dimensions, areas, and profiles, which can provide for improved structural integrity, affecting a flow of fluid within the duct, or fitting into crowded engine spaces. Additionally, the cross-sectional dimensions, areas, and profiles can be varies with a single tube, without requiring the interconnection of multiple tubes with variable cross-sections and transition elements there between. The variable cross-sections can provide a balance of structural integrity, with a need to minimize engine weight. Furthermore, the ducts provide for a small bending radius, which can provide for fitting the duct in a tight, crowded engine space, which can increase room in the crowded spaces, while reducing engine weight with shorter duct paths.

Additionally, the bellows as described herein can be utilized with the ducts as described, in order to provide improved strength or determinative vectors for flexion of the bellows within the particular ducts. Furthermore, the bellows can influence a flow of fluid passing through them.

To the extent not already described, the different features and structures of the various embodiments can be used in combination as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A duct for carrying a fluid, the duct comprising:
   a metal tubular element including both a longitudinally varying wall thickness and a varying cross-section along at least a portion of a length of the metal tubular element; and
   wherein the metal tubular element is configured to convey the fluid from a first portion to another portion; and
   wherein the metal tubular element has at least one bend with a radius of curvature that is less than twice a diameter of the metal tubular element.

2. The duct of claim 1 wherein the varying cross-section comprises a varying cross-sectional area.

3. The duct of claim 1 wherein the metal tubular element has a non-circular cross-section along a portion of the varying cross-section.

4. The duct of claim 1, further comprising a bellows wherein the bellows includes at least one of a helical convolution, a set of grooves, a concave outer wall, or a convex outer wall.

5. The duct of claim 1, further comprising a second metal tubular element provided interiorly of or exteriorly of the metal tubular element.

6. The duct of claim 5 wherein the second metal tubular element includes at least one of a varying wall thickness or a varying cross section along at least a portion of a length of the second metal tubular element.

7. A fluid delivery system for an engine, comprising:
   at least one metal tubular element that includes a longitudinally varying wall thickness along at least a portion of its length such that the metal tubular element is configured to have at least one of a mechanical property or a thermal property;
   wherein the metal tubular element has at least one curve that includes a radius of curvature less than twice a diameter of the metal tubular element.

8. The fluid delivery system of claim 7, further comprising a bellows wherein the bellows includes at least one of a helical convolution, a set of grooves, a concave outer wall, or a convex outer wall.

9. The fluid delivery system of claim 7 wherein the metal tubular element has a non-circular cross-section.

10. The fluid delivery system of claim 7 wherein the at least one metal tubular element comprising at least two metal tubular elements, with at least one of the at least two metal tubular elements includes the longitudinally varying wall thickness and a varying cross-section.

\* \* \* \* \*